United States Patent
Chang et al.

(10) Patent No.: US 11,382,045 B2
(45) Date of Patent: Jul. 5, 2022

(54) DEVICE AND METHOD OF HANDLING A TRANSMISSION BASED ON SPATIAL REUSE

(71) Applicant: Realtek Semiconductor Corp., HsinChu (TW)

(72) Inventors: Wei-Hsuan Chang, HsinChu (TW); Shau-Yu Cheng, HsinChu (TW); Wen-Yung Lee, HsinChu (TW); Yu-Shan Liang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 19 days.

(21) Appl. No.: 17/169,571

(22) Filed: Feb. 8, 2021

(65) Prior Publication Data

US 2022/0104143 A1    Mar. 31, 2022

(30) Foreign Application Priority Data

Sep. 30, 2020    (TW) .................................. 109134081

(51) Int. Cl.
*H04W 52/22* (2009.01)
*H04B 17/318* (2015.01)
*H04W 28/10* (2009.01)

(52) U.S. Cl.
CPC ........ *H04W 52/228* (2013.01); *H04B 17/318* (2015.01); *H04W 28/10* (2013.01)

(58) Field of Classification Search
None
See application file for complete search history.

(56) References Cited

U.S. PATENT DOCUMENTS

| | | | | |
|---|---|---|---|---|
| 10,039,115 | B2* | 7/2018 | Cariou | H04W 72/08 |
| 10,470,128 | B2* | 11/2019 | Noh | H04L 27/0006 |
| 11,190,945 | B2* | 11/2021 | Malichenko | H04W 24/10 |
| 11,191,038 | B2* | 11/2021 | Park | H04W 52/242 |
| 11,212,750 | B1* | 12/2021 | Ali | H04W 52/18 |
| 2017/0078891 | A1 | 3/2017 | Cariou | |
| 2019/0230703 | A1* | 7/2019 | Lv | H04W 74/0808 |

FOREIGN PATENT DOCUMENTS

WO    2015/112780 A1    7/2015

* cited by examiner

*Primary Examiner* — Tri H Phan
(74) *Attorney, Agent, or Firm* — Winston Hsu

(57) ABSTRACT

A first communication device for handling a transmission based on spatial reuse comprises at least one storage device; and at least one processing circuit, coupled to the at least one storage device, wherein the at least one storage device stores instructions, and the at least one processing circuit is configured to execute the instructions of: detecting a reception power level of a first packet transmitted in a channel by a second communication device; determining a minimum downward adjustment value according to the reception power level; determining a maximum downward adjustment value according to a reference transmission power level; and determining whether to transmit a second packet to a third communication device in the channel according to the minimum downward adjustment value and the maximum downward adjustment value.

9 Claims, 5 Drawing Sheets

| Index of MCS \ Offset | 0 | 1 | ... | j | ... | D |
|---|---|---|---|---|---|---|
| $MCS_0$ | $m_{00}$ | $m_{01}$ | ... | $m_{0j}$ | ... | $m_{0D}$ |
| $MCS_1$ | $m_{10}$ | $m_{11}$ | ... | $m_{1j}$ | ... | $m_{1D}$ |
| ... | ... | ... | ... | ... | ... | ... |
| $MCS_i$ | $m_{i0}$ | $m_{i1}$ | ... | $m_{ij}$ | ... | $m_{iD}$ |
| ... | ... | ... | ... | ... | ... | ... |

DEVICE AND METHOD OF HANDLING A TRANSMISSION BASED ON SPATIAL REUSE

BACKGROUND OF THE INVENTION

1. Field of the Invention

The present invention relates to a device and a method used in a wireless communication system, and more particularly, to a device and a method of handling a transmission based on spatial reuse.

2. Description of the Prior Art

Spatial reuse is proposed for reusing radio resources of overlap basic service sets (OBSSs). However, the IEEE 802.11 ax standard only specifies a maximum transmission power level of a transmission based on the spatial reuse, and operations of the transmission based on the spatial reuse are still unknown. Thus, how to handle the transmission based on the spatial reuse is an important problem to be solved.

SUMMARY OF THE INVENTION

The present invention therefore provides a communication device and a method of handling a transmission based on spatial reuse to solve the abovementioned problem.

A first communication device for handling a transmission based on spatial reuse comprises at least one storage device; and at least one processing circuit, coupled to the at least one storage device, wherein the at least one storage device stores instructions, and the at least one processing circuit is configured to execute the instructions of: detecting a reception power level of a first packet transmitted in a channel by a second communication device; determining a minimum downward adjustment value according to the reception power level; determining a maximum downward adjustment value according to a reference transmission power level; and determining whether to transmit a second packet to a third communication device in the channel according to the minimum downward adjustment value and the maximum downward adjustment value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a relation table according to an example of the present invention.

DETAILED DESCRIPTION

Figure 1:
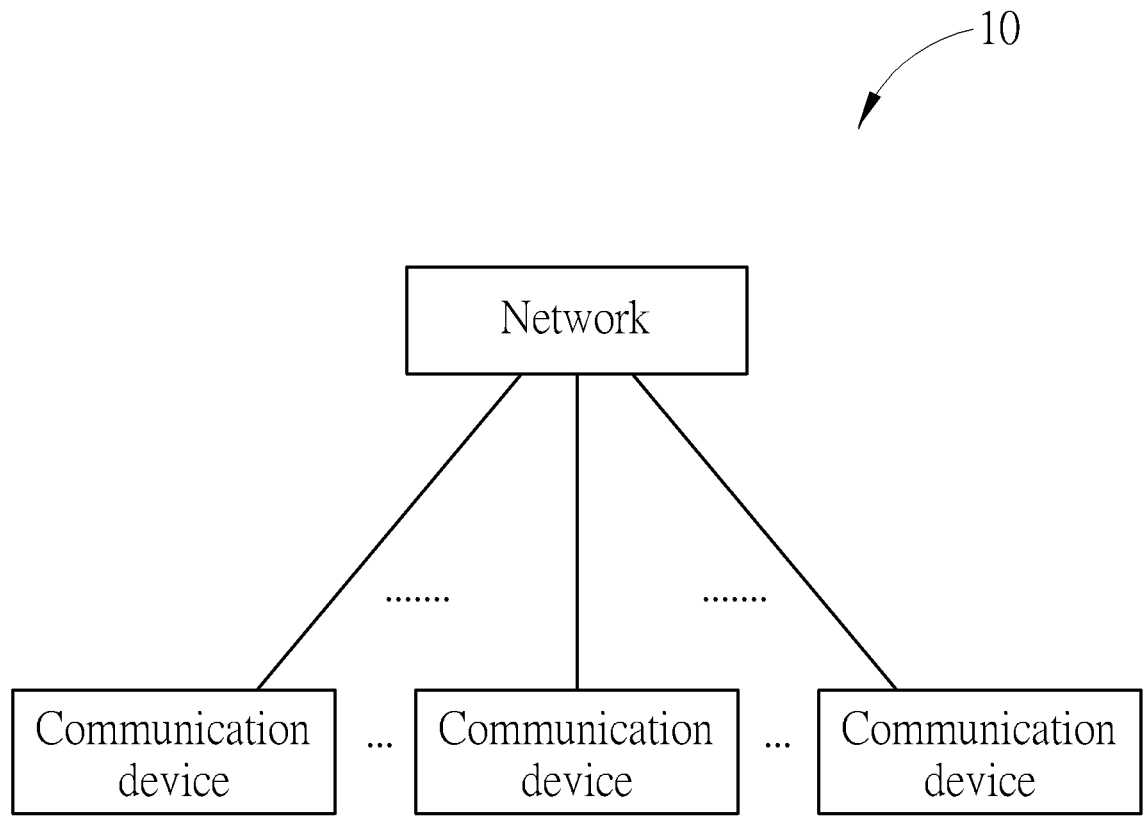
FIG. 1 is a schematic diagram of a wireless communication system according to an example of the present invention.

FIG. 1 is a schematic diagram of a wireless communication system 10 according to an example of the present invention. The communication system 10 may be any communication system using an orthogonal frequency-division multiplexing (OFDM) technique (or termed as discrete multi-tone modulation (DMT) technique), and is briefly composed of a network and communication devices. In FIG. 1, the network and the communication devices are simply utilized for illustrating the structure of the communication system 10. For example, the communication system 10 may be any wired communication system such as an asymmetric digital subscriber line (ADSL) system, a power line communication (PLC) system or an Ethernet over coax (EOC), or may be any wireless communication system such as a wireless local area network (WLAN), a Digital Video Broadcasting (DVB) system, a Long Term Evolution (LTE) system, a Long Term Evolution-advanced (LTE-A) system or a 5th generation (5G) system. For example, the network may be an access point (AP) in the WLAN. In addition, the network and the communication devices may be installed in a mobile phone, a laptop, etc., but are not limited herein.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network (e.g., cell or base station (BS) for controlling a cell) and the communication device can be seen as a transmitter or a receiver according to transmission direction, e.g., for an uplink (UL), the communication device is the transmitter and the network is the receiver, and for a downlink (DL), the network is the transmitter and the communication device is the receiver.

Figure 2:
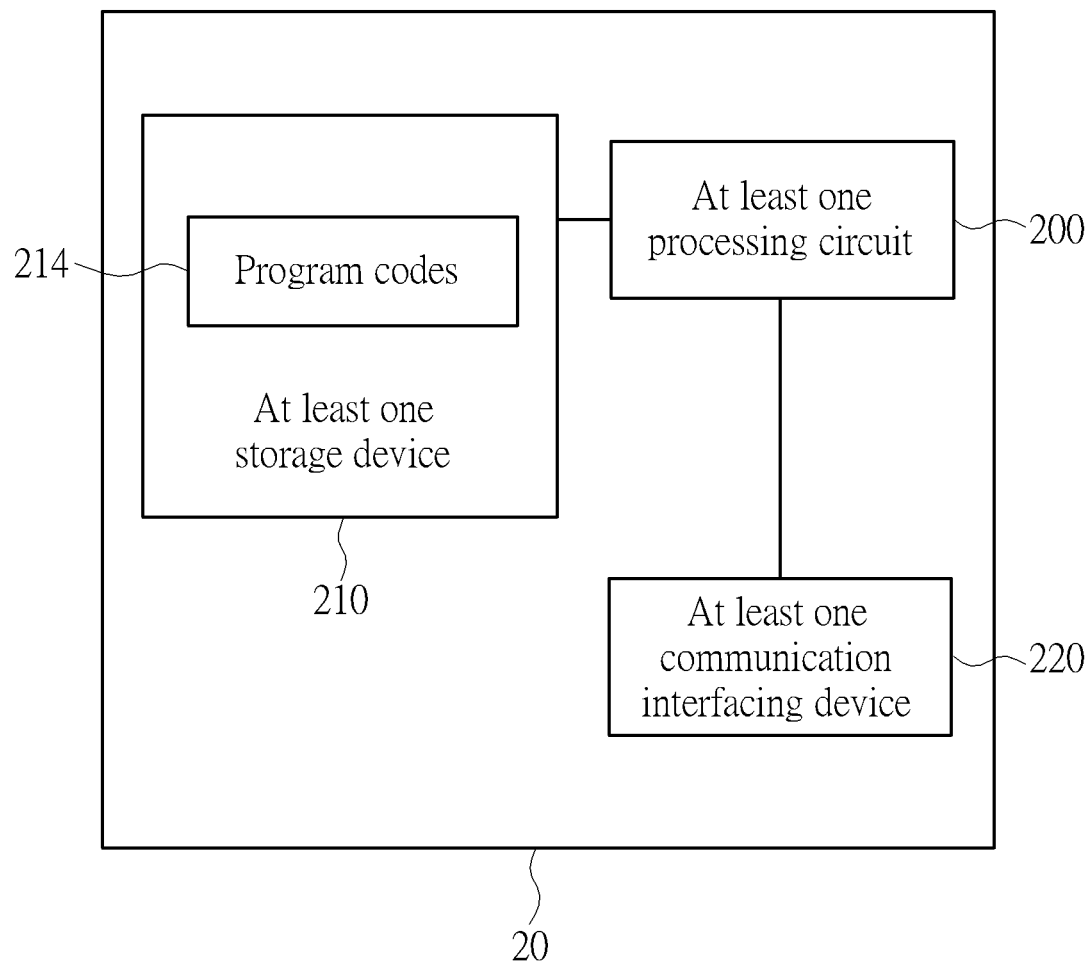
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 includes at least one processing circuit 200, at least one storage device 210 and at least one communication interfacing device 220. The at least one processing circuit 200 may include a microprocessor or Application Specific Integrated Circuit (ASIC). The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 may include a transceiver and is used to transmit and receive signals (e.g., data, messages and/or packets) according to processing results of the at least one processing circuit 200.

According to the prior art, transmission efficiency of a communication device may decrease in the following scenarios, if the communication device does not use (or does not support) a transmission based on spatial reuse. The communication device compares a reception power level and a threshold value of clear channel assessment (CCA) signal detection, when detecting the reception power level of a packet transmitted by another communication device in a channel. The communication device does not perform an operation of transmitting a packet in the channel, if the reception power level is greater than the threshold value.

If the communication device uses (or supports) the transmission based on the spatial reuse, the transmission efficiency of the communication device may increase in the following scenarios. The communication device compares the reception power level and a power detection parameter $OBSS\_PD_{level}$, when detecting the reception power level of the packet transmitted by another communication device in the channel. No matter whether the reception power level is greater than the threshold value of the CCA signal detection, the communication device may perform the operation of transmitting a packet in the channel, if the reception power level is smaller than the power detection parameter $OBSS\_PD_{level}$. That is, the spatial reuse is for reusing radio resources of overlap basic service sets (OBSSs). For the transmission of the spatial reuse, a maximum transmission power level $TX\_PWR_{max}$ of the packet transmitted by the communication device may be calculated according to the power detection parameter $OBSS\_PD_{level}$, a maximum power detection parameter $OBSS\_PD_{max}$, a minimum power detection parameter $OBSS\_PD_{min}$ and a reference transmission power level $TX\_PWR_{ref}$. The maximum transmission power level $TX\_PWR_{max}$ can be obtained according to the following equation:

$$TX\_PWR_{max} = \begin{cases} \text{unconstrained, if } OBSS_{PD_{level}} \leq OBSS_{PD_{min}}, \\ TX\_PWR_{ref} - (OBSS\_PD_{level} - OBSS\_PD_{min}), \\ \text{if } OBSS\_PD_{max} \geq OBSS\_PD_{level} > OBSS\_PD_{min} \end{cases} \quad \text{(Eq. 1)}$$

According to the equation (Eq.1), the operation that another communication device transmits the packet does not interfere with the communication device performing transmission based on the spatial reuse, when the power detection parameter $OBSS\_PD_{level}$ is smaller than or equal to the minimum power detection parameter $OBSS\_PD_{min}$ and the reception power level is smaller than the power detection parameter $OBSS\_PD_{level}$. Thus, the maximum transmission power level $TX\_PWR_{max}$ may be unconstrained to be determined.

According to the equation (Eq.1), the maximum transmission power level $TX\_PWR_{max}$ is decreased by a difference between the power detection parameter $OBSS\_PD_{level}$ and the minimum power detection parameter $OBSS\_PD_{min}$ according to the reference transmission power level $TX\_PWR_{ref}$, when the power detection parameter $OBSS\_PD_{level}$ is between the maximum power detection parameter $OBSS\_PD_{max}$ and the minimum power detection parameter $OBSS\_PD_{min}$.

Figure 3:
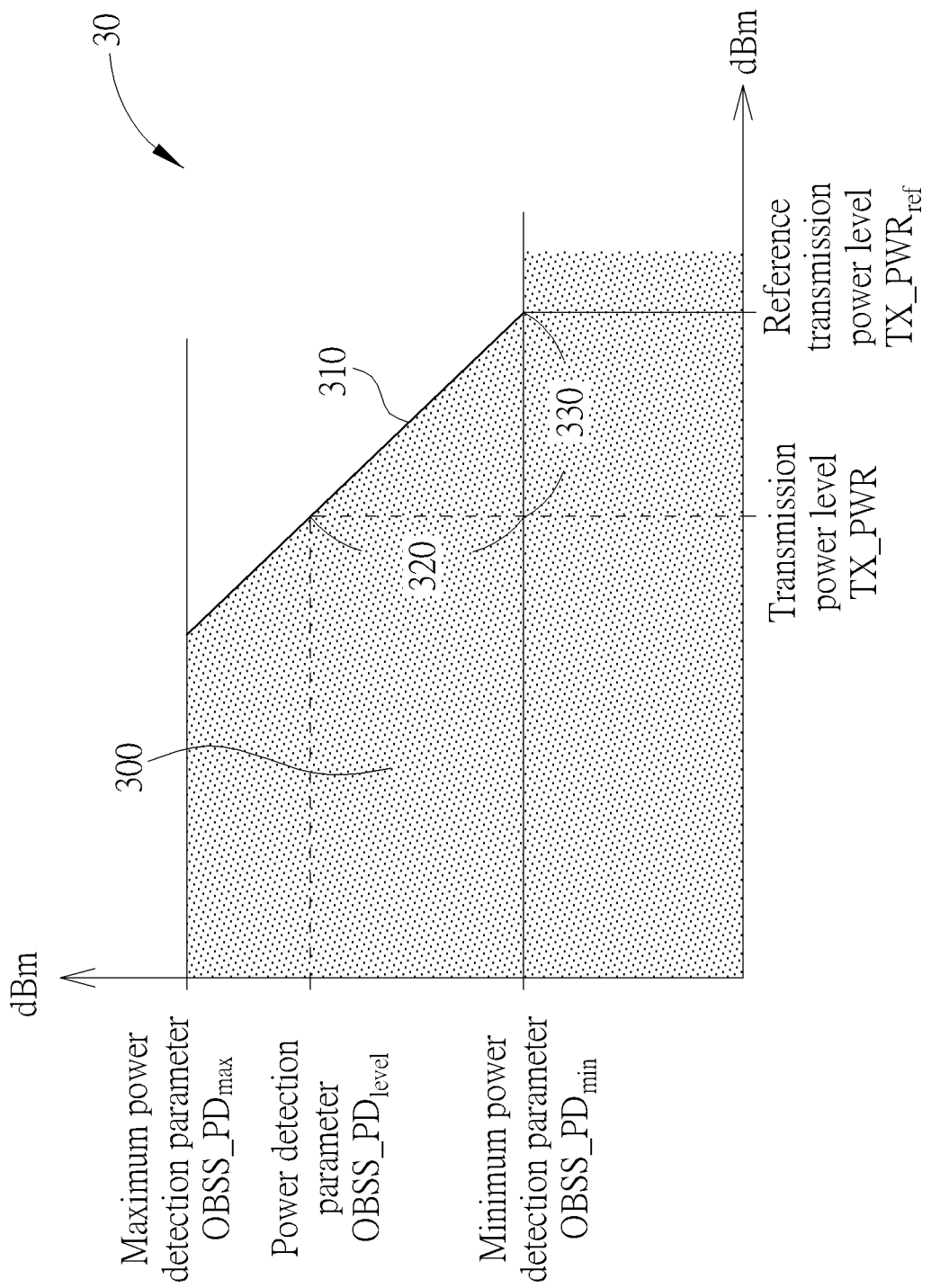
FIG. 3 is a schematic diagram of an adjustment rule for overlap basic service sets according to an example of the present invention.

FIG. 3 is a schematic diagram of an adjustment rule 30 for OBSSs according to an example of the present invention. There is a relation between a power detection parameter $OBSS\_PD_{level}$ and a transmission power level $TX\_PWR$ in FIG. 3. A shaded area 300 means an allowable relation between the power detection parameter $OBSS\_PD_{level}$ and the transmission power level $TX\_PWR$. The transmission power level $TX\_PWR$ may be unconstrained to be determined, when the power detection parameter $OBSS\_PD_{level}$ is smaller than the minimum power detection parameter $OBSS\_PD_{min}$. The transmission power level $TX\_PWR$ may be determined according to the power detection parameter $OBSS\_PD_{level}$, when the power detection parameter $OBSS\_PD_{level}$ is between the maximum power detection parameter $OBSS\_PD_{max}$ and the minimum power detection parameter $OBSS\_PD_{min}$. For example, the transmission power level $TX\_PWR$ is a fixed value, if the power detection parameter $OBSS\_PD_{level}$ is a fixed value. It should be noted that, a greater power detection parameter $OBSS\_PD_{level}$ may create more opportunities of the transmissions based on the spatial reuse, e.g., the communication device may transmit a packet, because the reception power level is smaller than the power detection parameter $OBSS\_PD_{level}$. However, According to FIG. 3, the greater power detection parameter $OBSS\_PD_{level}$ is corresponding to a smaller transmission power level $TX\_PWR$, such that a receiver may not successfully receive the packet transmitted by the communication device. In addition, a slope of a slash line 310 may be 1. That is, a difference 320 between the power detection parameter $OBSS\_PD_{level}$ and the minimum power detection parameter $OBSS\_PD_{min}$ may be equal to a difference 330 between the transmission power level $TX\_PWR$ and the reference transmission power level $TX\_PWR_{ref}$, if the power detection parameter $OBSS\_PD_{level}$ and the transmission power level $TX\_PWR$ are shown by dotted lines in FIG. 3.

The IEEE 802.11 ax standard only specifies that the power detection parameter $OBSS\_PD_{level}$ is determined by the communication device and that the maximum power detection parameter $OBSS\_PD_{max}$ and the minimum power detection parameter $OBSS\_PD_{min}$ are determined by a BS (e.g., an AP). In addition, the reference transmission power level $TX\_PWR_{ref}$ is a reference value of the transmission power level $TX\_PWR$ (e.g., is determined in the IEEE 802.11 ax standard). However, the IEEE 802.11 ax standard does not specify how to determine these parameters, and does not specify how to determine (e.g., calculate) a transmission power level, either. In addition, the IEEE 802.11 ax standard does not specify a relation between a transmission rate and the transmission based on the spatial reuse.

The spatial reuse includes two mechanisms. The first mechanism is OBSS-based spatial reuse, and the second mechanism is spatial reuse parameter (SRP)-based spatial reuse. For the OBSS-based spatial reuse, the present invention not only provides transmission power control of a transmitter, but also provides a selection associated to a modulation and coding scheme (MCS) (e.g., adjusting a transmission rate). Thus, the problem regarding the transmission based on the spatial reuse is solved.

Figure 4:
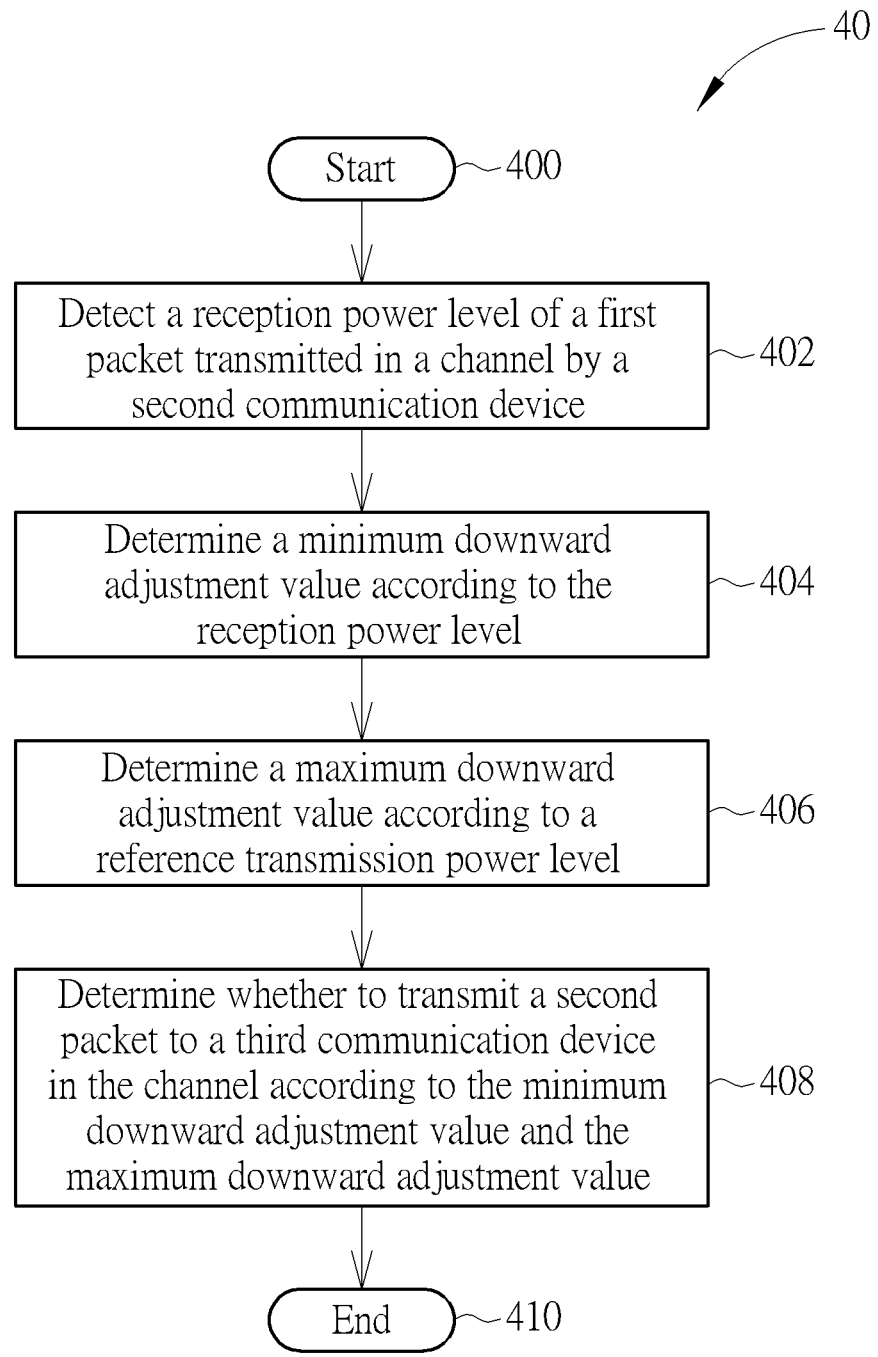
FIG. 4 is a flowchart of a process according to an example of the present invention.

FIG. 4 is a flowchart of a process 40 according to an example of the present invention. The process 40 may be utilized in a first communication device, to handle a transmission based on spatial reuse. The process 40 includes the following steps:

Step 400: Start.

Step 402: Detect a reception power level of a first packet transmitted in a channel by a second communication device.

Step 404: Determine a minimum downward adjustment value according to the reception power level.

Step 406: Determine a maximum downward adjustment value according to a reference transmission power level.

Step 408: Determine whether to transmit a second packet to a third communication device in the channel according to the minimum downward adjustment value and the maximum downward adjustment value.

Step 410: End.

According to the process 40, the first communication device detects whether another communication device (e.g., second communication device) performs a transmission in a channel, before transmitting a second packet to a third communication device. The first communication device detects a reception power level of a first packet, if the first communication device detects the first packet transmitted in the channel by the second communication device. Then, the first communication device determines (e.g., calculates) a minimum downward adjustment value according to the reception power level, and determines (e.g., calculates) a maximum downward adjustment value according to a reference transmission power level (e.g., the reference transmission power level $TX\_PWR_{ref}$). The first communication device determines whether to transmit the second packet to the third communication device in the channel according to the minimum downward adjustment value and the maximum downward adjustment value. That is, the first communication device avoids to interfere with the second communication device (considering the minimum downward adjustment value), and avoids that the third communication device may not successfully receive the second packet (considering the maximum downward adjustment value). Thus, the process 40 may reduce unnecessary packet (re)transmissions. The first communication device may efficiently perform the transmissions based on the spatial reuse.

Realization of the process 40 is not limited to the above description. The following examples may be applied for realizing the process 40.

In one example, after detecting the reception power level of the first packet, the first communication device determines (e.g., calculates) a transmission power level of the second packet, if condition(s) of the spatial reuse is satisfied (e.g., the reception power level is smaller than the minimum power detection parameter $OBSS\_PD_{min}$).

In one example, the first communication device stops transmitting the second packet to the third communication device, if the maximum downward adjustment value is smaller than the minimum downward adjustment value. In one example, the first communication device determines (e.g., calculates) a transmission power level of the second packet, if the maximum downward adjustment value is greater than or equal to the minimum downward adjustment value. Then, the communication device transmits the second packet to the third communication device in the channel according to the transmission power level. That is, the maximum downward adjustment value may be greater than or equal to the minimum downward adjustment value, such that the first communication device does not interfere with the second communication device, and the third communication device may successfully receive the second packet. TX_PWR represents a transmission power level of the second packet, and TX_PWR_SR represents a transmission power level of the second packet when the maximum downward adjustment value is greater than or equal to the minimum downward adjustment value. According to the above examples, the transmission power level TX_PWR and the transmission power level TX_PWR_SR can be obtained according to the following equations:

$$TX\_PWR = \begin{cases} TX\_PWR\_SR, & \text{if } PWR\_DIFFERENCE\_PKT \geq \\ & PWR\_DIFFERENCE\_SR \\ 0, & \text{otherwise} \end{cases} \quad \text{(Eq. 2)}$$

$$TX\_PWR\_SR = TX\_PWR_{ref} - PWR\_DIFFERENCE\_SR, \quad \text{(Eq. 3)}$$

wherein PWR_DIFFERENCE_PKT is the maximum downward adjustment value, and PWR_DIFFERENCE_SR is the minimum downward adjustment value.

In one example, the first communication device determines the minimum downward adjustment value according to the reception power level of the first packet transmitted by the second communication device. The minimum downward adjustment value PWR_DIFFERENCE_SR can be obtained according to the following equation:

$$PWR\_DIFFERENCE\_SR = RPL - OBSS\_PD_{min}, \quad \text{(Eq. 4)}$$

wherein RPL is the reception power level of the first packet.

In one example, the reception power level of the first packet may be considered as the power detection parameter $OBSS\_PD_{level}$ according to the equations (Eq.1), (Eq.3) and (Eq.4). That is, the first communication device may adjust the transmission power level TX_PWR of the second packet according to the reception power level of the first packet detected in the channel.

In one example, the first communication device determines the maximum downward adjustment value according to the reference transmission power level. The maximum downward adjustment value PWR_DIFFERENCE_PKT can be obtained according to the following equation:

$$PWR\_DIFFERENCE\_PKT = TX\_PWR_{ref} - (TX\_PWR\_NORMAL - TX\_PWR\_TOLERANCE), \quad \text{(Eq. 5)}$$

wherein TX_PWR_NORMAL is a default transmission power level of the second packet, and TX_PWR_TOLERANCE is an allowable downward adjustment value for the transmission power level of the second packet.

In one example, the first communication device belongs to a first basic service set (BSS). In one example, the second communication device belongs to a second BSS different from the first BSS. In one example, the second BSS of the second communication device belongs to a spatial reuse group (SRG) or a non-SRG. For example, the minimum downward adjustment value PWR_DIFFERENCE_SR can be obtained according to the following equation, if the second BSS belongs to the SRG, and the channel may allow a plurality of packets (e.g., N packets ($q_1, \ldots, q_i, \ldots, q_N$)) in a time period of a transmit opportunity (TXOP):

$$PWR\_DIFFERENCE\_SR = TX\_PWR_{ref} - \max(RPL_i - SRG\_OBSS\_PD_{min}), \quad \text{(Eq. 6)}$$

wherein $i = \{k \in \mathbb{N}, 1 \leq k \leq N\}$, and the minimum power detection parameter $OBSS\_PD_{min}$ in the equation (Eq.4) is replaced by the minimum power detection parameter for the SRG $SRG\_OBSS\_PD_{min}$.

The minimum downward adjustment value PWR_DIFFERENCE_SR can be obtained according to the following equation, if the second BSS belongs to the non-SRG and the first packet is a latest received packet:

$$PWR\_DIFFERENCE\_SR = TX\_PWR_{ref} - (RPL - non\_SRG\_OBSS\_PD_{min}), \quad \text{(Eq. 7)}$$

wherein the minimum power detection parameter $OBSS\_PD_{min}$ in the equation (Eq.4) is replaced by the minimum power detection parameter for the non-SRG $non\_SRG\_OBSS\_PD_{min}$.

In one example, the third communication device belongs to the first BSS. That is, the first communication device and the third communication device belong to the same BSS.

In one example, the first communication device determines an offset according to the maximum downward adjustment value and the minimum downward adjustment value, if the maximum downward adjustment value is smaller than the minimum downward adjustment value. The first communication device determines a transmission rate of the second packet according to the offset and a default transmission rate, and determines a transmission power level of the second packet according to the minimum downward adjustment value and the reference transmission power level. The first communication device transmits the second packet to the third communication device in the channel according to the transmission rate and the transmission power level. That is, the third communication device may not successfully receive the second packet transmitted by the first communication device according to the transmission based on the spatial reuse, when the maximum downward adjustment value is smaller than the minimum downward adjustment value (i.e., the transmission power level of the second packet is small). Under this situation, the first communication device may increase the maximum downward adjustment value by determining (e.g., adjusting) the transmission rate of the second packet, to create more opportunities of the transmissions based on the spatial reuse.

In one example, the first communication device determines the offset according to the maximum downward adjustment value and minimum downward adjustment value. The offset TXDIFF can be obtained according to the following equation:

$$TSDIFF = \max(0, TX\_PWR\_NORMAL - TX\_PWR\_SR - \quad \text{(Eq. 8)}$$
$$TX\_PWR\_TOLERANCE)$$
$$= \max(0, PWR\_DIFFERENCE\_SR -$$
$$PWR\_DIFFERENCE\_PKT),$$

According to the equation (Eq.8), the offset is a difference between the maximum downward adjustment value and minimum downward adjustment value. That is, the offset is a value that the maximum downward adjustment value may be increased, to decrease a transmission power level of the second packet received successfully by the third communication device.

In one example, the default transmission rate is determined according to a MCS. In one example, the MCS is stored in a table. Columns of the table include factors (e.g., modulation types, coding rates, spatial streams and bandwidths) affecting a transmission rate. Rows of the table include indices of the MCS. In other words, different indices of the MCS are corresponding to different combinations of factors, and are corresponding to different transmission rates.

Figure 5:
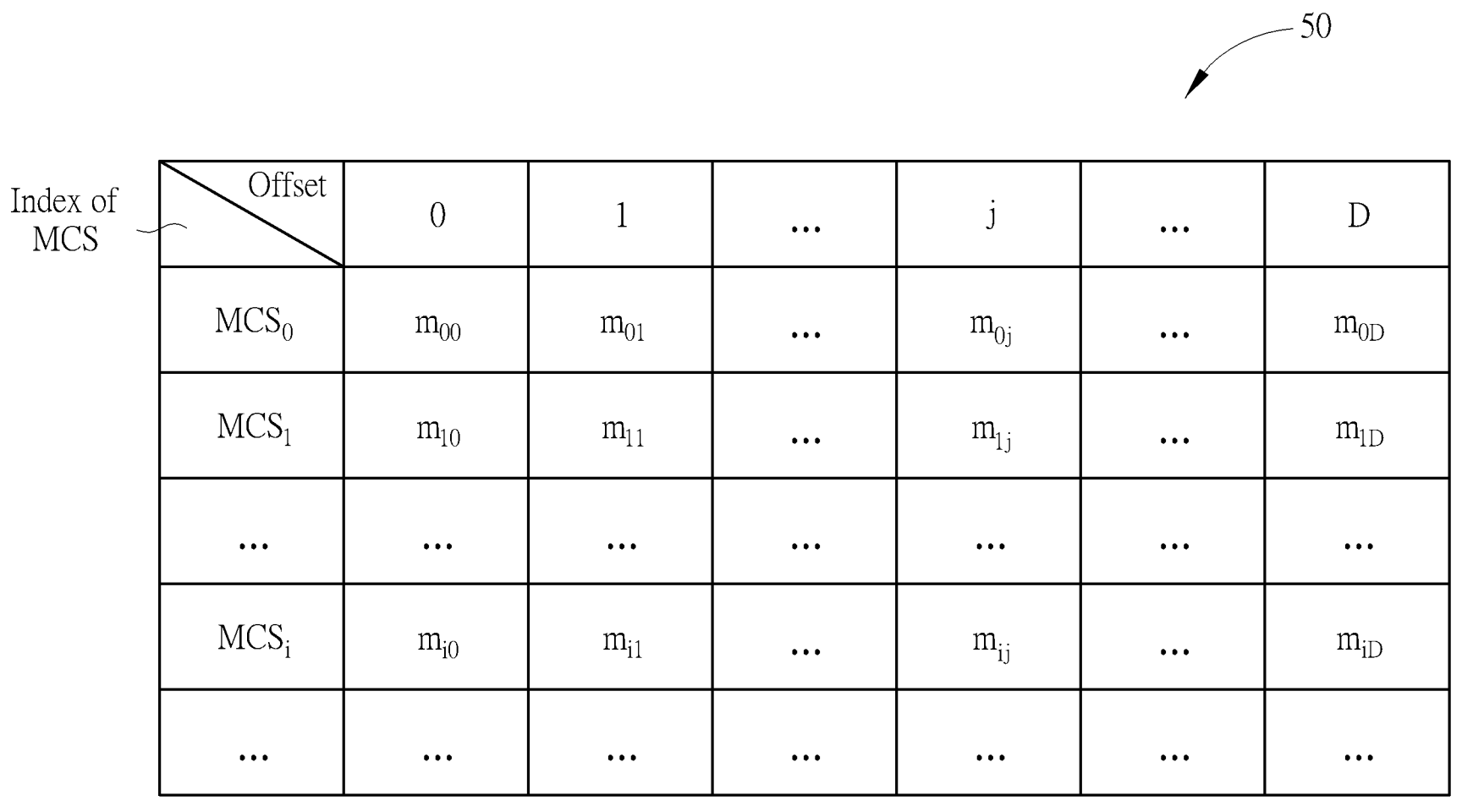

FIG. 5 is a relation table 50 according to an example of the present invention. The relation table 50 includes indices of a MCS and an offset. A downward adjustment value of a transmission rate may be obtained according to the indices of the MCS and the offset. For example, the downward adjustment value of the transmission rate is $m_{00}$, if an index of the MCS corresponding to a default transmission rate is $MCS_0$ and the offset is 0 dB. The downward adjustment value of the transmission rate is $m_{ij}$, if the index of the MCS corresponding to the default transmission rate is $MCS_i$ and the offset is j dB. In addition, D is an upper limit of the offset, i.e., $D = OBSS\_PD_{max} - OBSS\_PD_{min}$.

In one example, the first communication device determines the transmission rate of the second packet according to the offset and the default transmission rate. The transmission rate TX_RATE can be obtained according to the following equation:

$$TX\_RATE = \begin{cases} TX\_RATE\_NORMAL, & \text{if } TXDIFF = 0 \\ TX\_RATE\_NORMAL - \\ RATE\_TABLE[MCS_i][TXDIFF], & \text{if } TXDIFF > 0 \end{cases} \quad \text{(Eq. 9)}$$

wherein TX_PWR_NORMAL is the default transmission power level of the second packet, and $MCS_i$ is the index of the MCS corresponding to the default transmission rate. $RATE\_TABLE[MCS_i][TXDIFF]$ is the downward adjustment value of the transmission rate corresponding to the index of the MCS and the offset in FIG. 5.

In one example, the downward adjustment value of the transmission rate may be a downward adjustment value of the indices of the MCS. For example, $m_{ij}=1$ means that the transmission rate of the second packet may be a transmission power level corresponding to $MCS_{i-1}$, when the index of the MCS corresponding to the default transmission rate is $MCS_i$ and the offset are j dB.

In one example, if the channel may allow a plurality of packets (e.g., N packets $(q_1, \ldots, q_i, \ldots, q_N)$) in a time period of a TXOP, the transmission rate TX_PWR_SR of the second packet and the offset TXDIFF can be obtained according to the following equations, when the offset is greater than 0 and the second BSS of the second communication device belongs to a SRG:

$$TX\_PWR\_SR = \quad \text{(Eq. 10)}$$
$$TX\_PWR_{ref} - \max(RPL_i - SRG\_OBSS\_PD_{min}),$$

$$TXDIFF = TX\_PWR\_NORMAL - TX\_PWR\_SR - \quad \text{(Eq. 11)}$$
$$TX\_PWR\_TOLERANCE$$
$$= TX\_PWR\_NORMAL - (TX\_PWR_{ref} -$$
$$\max(RPL_i - SRG\_OBSS\_PD\_min)) -$$
$$TX\_PWR\_TOLERANCE,$$

wherein $1 \le i \le N$, and the minimum power detection parameter $OBSS\_PD_{min}$ in the equation (Eq.4) is replaced by the minimum power detection parameter for the SRG $SRG\_OBSS\_PD_{min}$.

In one example, if the first packet is a latest received packet, the transmission rate TX_PWR_SR of the second packet and the offset TXDIFF can be obtained according to the following equations, when the offset is greater than 0 and the second BSS of the second communication device belongs to a non-SRG:

$$TX\_PWR\_SR = \quad \text{(Eq. 12)}$$
$$TX\_PWR_{ref} - (RPL - non\_SRG\_OBSS\_PD\_min),$$

$$TXDIFF = TX\_PWR\_NORMAL - TX\_PWR\_SR - \quad \text{(Eq. 13)}$$
$$TX\_PWR\_TOLERANCE$$
$$= TX\_PWR\_NORMAL - (TX\_PWR_{ref} -$$
$$(RPL - non\_SRG\_OBSS\_PD\_min)) -$$
$$TX\_PWR\_TOLERANCE,$$

wherein the minimum power detection parameter $OBSS\_PD_{min}$ in the equation (Eq.4) is replaced by the minimum power detection parameter for the non-SRG $non\_SRG\_OBSS\_PD_{min}$.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a device and a method for handling a transmission based on spatial reuse. A communication device calculates a maximum downward adjustment value of a transmission power level and a minimum downward adjustment value of the transmission power level, to determine whether to perform the transmission based on the spatial reuse. Thus, the problem of handling the transmission based on the spatial reuse is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first communication device for handling a transmission based on spatial reuse, comprising:
    at least one storage device; and
    at least one processing circuit, coupled to the at least one storage device, wherein the at least one storage device stores instructions, and the at least one processing circuit is configured to execute the instructions of:
        detecting a reception power level of a first packet transmitted in a channel by a second communication device;
        determining a minimum downward adjustment value according to the reception power level;
        determining a maximum downward adjustment value according to a reference transmission power level; and
        determining whether to transmit a second packet to a third communication device in the channel according to the minimum downward adjustment value and the maximum downward adjustment value.

2. The first communication device of claim 1, wherein the instructions comprise:
    stopping transmitting the second packet to the third communication device, if the maximum downward adjustment value is smaller than the minimum downward adjustment value.

3. The first communication device of claim 1, wherein the instruction of determining whether to transmit the second packet according to the minimum downward adjustment value and the maximum downward adjustment value comprises:
    determining a transmission power level of the second packet according to the minimum downward adjustment and the reference transmission power level, if the maximum downward adjustment value is greater than or equal to the minimum downward adjustment value; and
    transmitting the second packet to the third communication device in the channel according to the transmission power level.

4. The first communication device of claim 1, wherein the first communication device belongs to a first basic service set (BSS).

5. The first communication device of claim 4, wherein the second communication device belongs to a second BSS different from the first BSS.

6. The first communication device of claim 5, wherein the second BSS of the second communication device belongs to a spatial reuse group (SRG) or a non-SRG.

7. The first communication device of claim 4, wherein the third communication device belongs to the first BSS.

8. The first communication device of claim 1, wherein the instruction of determining whether to transmit the second packet according to the minimum downward adjustment value and the maximum downward adjustment value comprises:
    determining an offset according to the maximum downward adjustment value and the minimum downward adjustment value, if the maximum downward adjustment value is smaller than the minimum downward adjustment value;
    determining a transmission rate of the second packet according to the offset and a default transmission rate;
    determining a transmission power level of the second packet according to the minimum downward adjustment value and the reference transmission power level; and
    transmitting the second packet to the third communication device in the channel according to the transmission rate and the transmission power level.

9. The first communication device of claim 8, wherein the default transmission rate is determined according to a modulation and coding scheme (MCS).

* * * * *